F. G. FORD.
ASH PAIL AND SIEVE.
No. 178,132. Patented May 30, 1876.
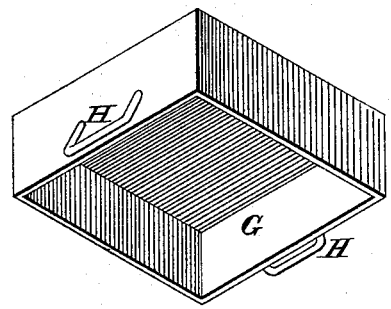
Fig. 1.
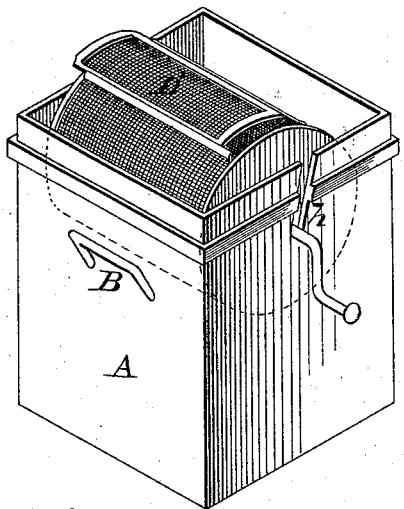
Fig. 2. Fig. 3.
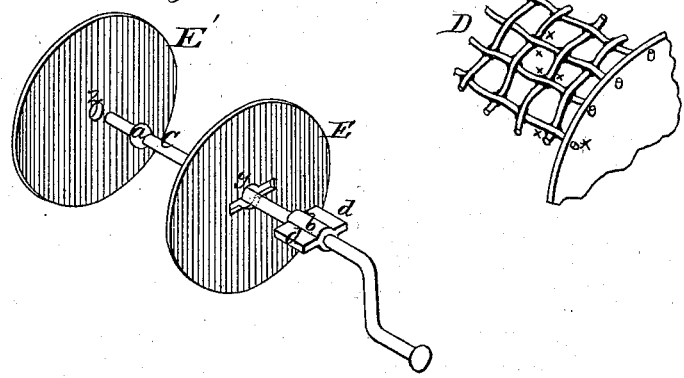
WITNESSES
Henry N. Miller
Franck L. Ourand
INVENTOR
Frederic G. Ford,
By Alexander Mason
Attorneys

UNITED STATES PATENT OFFICE.

FREDERIC G. FORD, OF PHILADELPHIA, PENNSYLVANIA.

IMPROVEMENT IN ASH PAILS AND SIEVES.

Specification forming part of Letters Patent No. 178,132, dated May 30, 1876; application filed April 7, 1876.

*To all whom it may concern:*

Be it known that I, F. G. FORD, of Philadelphia, in the county of Philadelphia, and in the State of Pennsylvania, have invented certain new and useful Improvements in Ash Pail and Sieve; and do hereby declare that the following is a full, clear, and exact description thereof, reference being had to the accompanying drawings, and to the letters of reference marked thereon, making a part of this specification.

The nature of my invention consists in the construction and arrangement of an ash pail and sieve, as will be hereinafter more fully set forth.

In order to enable others skilled in the art to which my invention appertains to make and use the same, I will now proceed to describe its construction and operation, referring to the annexed drawing, in which—

Figure 1 is a perspective view of my invention, with the top removed and elevated above the main body. Figs. 2 and 3 are detached views of parts thereof.

A represents the box or pail, of any suitable dimensions, and of any material suitable for the purpose, though I prefer to make it of tin or other sheet metal. This box or pail is provided on opposite sides with handles B B, and in the other two sides are made inclined slots $h$ $h$, to receive the shaft C of the sifter. The sifter is made of woven wire, in the form of a cylinder, D, with heads E E', the longitudinal wires of the cylinder being passed through said heads and clinched on the outer side thereof. In the cylinder D is formed a sliding door, D', as shown in Fig. 1, through which the ashes are admitted and the cinders afterward removed.

In the manufacture of the sieve, after the woven-wire cylinder or drum has been fastened to the heads, as described, the entire sieve is galvanized by the usual process, whereby a certain amount of metal is deposited, as shown at $x$ $x$, wherever two pieces of wire or metal come in contact with each other, thus uniting the same, and making the sieve, as it were, of one solid piece.

The shaft C is provided near the end with a flange or collar, $a$, and near the crank end of said shaft is secured a collar, $b$, with projecting side flanges or wings $d$ $d$. In the head E of the sieve is a central aperture, $y$, large enough for the passage of the collar $a$ on the shaft, and with side slots for the entrance of the flanges or wings $d$. In the head E' is a hole, $z$, for the passage of the end of the shaft C, the collar $a$ preventing the shaft from passing any farther than to just allow the flanges $d$ to enter the slots at the sides of the aperture $y$, so that by turning the crank C' on the end of said shaft the sieve will be rotated.

It will readily be seen that by this construction of the parts the shaft can be taken out of the cylinder, and the whole packed for transportation within the box or pail A.

The box is provided with a cover, G, in the shape of a shallow pan, having side handles H H, as shown, which pan may be used for dumping the cinders after the ashes have been sifted, the box A answering for the purpose of carrying out the ashes.

Having thus fully described my invention, what I claim as new, and desire to secure by Letters Patent, is—

1. An ash-sieve formed in the shape of a cylinder, and consisting of a series of longitudinal and circumferential wires, the latter bent over and under the former, and galvanized, so that deposits of metal are made at the points $x$ to solder the parts, and the ends of the longitudinal wires passed through perforations in the heads E E', and clinched thereto, as set forth.

2. The combination of the wire cylinder D, head E', with central hole $z$, head E, with hole and slots $y$, and the shaft C, having collar $a$ and hub $b$, with flanges or wings $d$ $d$, substantially as and for the purposes herein set forth.

3. The combination of the box A, having handles B, the revolving sieve D E E', constructed as described, with center shaft C, with collar $a$ and flanged hub $b$, and the top or pan G, with handles H H, substantially as and for the purposes herein set forth.

In testimony that I claim the foregoing I have hereunto set my hand this 23d day of March, 1876.

F. G. FORD.

Witnesses:
H. A. HALL,
M. L. STOWELL.